United States Patent Office 3,162,611
Patented Dec. 22, 1964

3,162,611
PRINTING INK
Arleen S. Varron and Paul D. Whyzmuzis, Jamaica, N.Y., assignors to Interchemical Corporation, New York, N.Y., a corporation of Ohio
No Drawing. Filed Aug. 7, 1962, Ser. No. 215,285
25 Claims. (Cl. 260—4)

This invention relates to a novel printing ink which is particularly useful in that it may be used on polyolefins with effective results.

The problem of printing and coating on polyolefins, particularly polyethylene and polypropylene is well known in the printing art. In general polyolefins display very poor adhesion to printing and coatings applied thereto. Slight abrasion such as gentle scraping with the fingernail removes printing from polyolefins as does even minimal bending or stretching.

Many techniques have been used in treating polyolefins in order to overcome this lack of adhesion. These techniques usually involve pretreating or conditioning the surfaces of the polyolefins in order to make these surfaces adhere to printing or coatings applied thereto. Some widely used pretreating techniques are: treating the surface by the photochemical action of chlorine to cause surface oxidation; acid treatment of the surface; flame treatment of the surface; exposing the surface to the action of ozone as well as treatment of the surface with electron beams or gamma rays. Because such pretreating techniques are time consuming, difficult and expensive, printing inks and coating compositions which may be effectively used on untreated polyolefins are continually being sought by the polyolefin industry.

We have now discovered a novel printing ink and coating composition, which in addition to producing excellent results on plasitcs in general, may be used on untreated polyolefins to yield printing of outstanding adhesion to the substrate as well as excellent scratch resistance.

The novel inks of this invention comprise vehicles which are dispersions, in a volatile hydrocarbon solution of cyclized rubber or limed rosin, of particulate interpolymers which form the particulate phase of the latices described in U.S. Patent 2,767,152. In addition to said interpolymers, the vehicles further contain dispersions, in said solutions, of wax-like polyethylenes or polyethylene derivatives such as polyethylene glycol and polyethylene glycol distearate.

The interpolymers of U.S. Patent 2,767,153 are described as interpolymers comprising 35–60 parts by weight of an unsaturated ester taken from the group consisting of straight-chain and branched-chain saturated aliphatic alcohol esters of acrylic and methacrylic acids containing a total of about 5–20 carbon atoms in the alcohol radical of which about 5–14 carbon atoms comprise the longest continuous chain thereof, about 3–10 parts by weight of an unsaturated nitrile taken from the group consisting of acrylonitrile and methacrylonitrile, about 2–5 parts by weight of an unsaturated monocarboxylic acid taken from the group consisting of acrylic acid, methacrylic acid, cinnamic acid, atropic acid, and crotonic acid and, correspondingly, about 60–25 parts by weight of a monovinylidene aromatic hydrocarbon, the interpolymer particles in said latex having an average diameter of about 0.1 to 0.5 micron. It has been found that best results are obtained when said interpolymer comprises from 35–45 parts of either ethylhexyl acrylate, decyl acrylate or tridecyl acrylate; 3–10 parts of acrylonitrile, 2–5 parts of methacrylic acid and 60–40 parts of styrene. (It should be noted that all proportions set forth in the present specification and claims are by weight unless otherwise stated.)

The wax-like dispersed material may be a low molecular weight waxy polyethylene, e.g., polyethylene having a molecular weight of 40,000 or lower, most preferably from 2500 to 10,000. Polyethylene glycol "waxes" having molecular weights of less than 20,000 as well as polyethylene glycol distearate may also be used as the wax-like dispersed material.

Best results are achieved when the dissolved resin is cyclized rubber. The cyclized rubber may be made by any conventional method such as condensing rubber with metallic or metalloid halide catalysts such as stannic chloride, titanium tetrachloride, ferric chloride and antimony pentachloride in a suitable solvent. Upon the treatment of the resultant product with acetone or alcohol, the salt is reformed together with formation of cyclized rubber. Similar results may be obtained following the methods set forth in "The Paper Trade Journal," page 96, February 23, 1939; "Rubber Age," April 1939; and "Journal of Industrial Engineering Chemistry," XIX, 1033, XXVI, 125, and XXXIII, 389. Details of preparation are also disclosed in U.S. Patents Nos. 1,797,188; 1,846,247; 1,853,334 and 2,052,931.

When the resin used is cyclized rubber, not only does the printing have excellent adhesion, flexibility and scratch resistance but the gloss and rub resistance of the printing is excellent. Limed rosin provides an excellent substitute for cyclized rubber displaying the superior characteristics of the cyclized rubber in the ink.

The type of solvent used will depend to a large extent on the nature of the printing process in which the ink is to be used. For example, when the printing on polyolefins is carried out by dry-offset, letterpress, lithographic and silk screen techniques, predominantly paraffinic hydrocarbon solvents having boiling ranges from about 300° to 650° F. are preferred. For gravure or flexographic printing paraffinic solvents having boiling ranges from 145 to 300° F. are used as well as combinations of said paraffinic solvents with alcohols and esters.

Preferably the ratio of cyclized rubber or limed rosin to interpolymer in the inks is from 0.5:1 to 2:1. Preferably from about 0.10 to 0.30 part and most preferably from about 0.15 to 0.25 part of said waxy-material are dispersed for each part of the cyclized rubber or limed rosin.

While the inks of this invention display excellent adhesion to untreated polypropylene and low density polyethylene, the adhesion to high density polyethylene is not up to a par with the adhesion to the polypropylene and low density polyethylene. However, the addition of a small amount of long-chain fatty amides or long-chain fatty acids to the composition brings the adhesion to high density polyethylene up to a par with the adhesion to the other polyolefins. Among the long-chain fatty amides which may be used are octanamide, decanamide, dodecanamide, tetradecanamide, hexadecanamide, octadecanamide, 9-octadecenamide, 9-12 octadecadienamide and eicosanamide. Suitable fatty acids for this purpose include stearic acid and oleic acid. When used, the fatty amide or the fatty acid preferably constitutes from 3% to 6% of the weight of either the cyclized rubber or limed rosin.

In preparing the novel inks of this invention, the resinous solution and the aqueous interpolymer latex are mixed together on appropriate mixing or milling means e.g., a 3 roll mill or a dough mixer. The water is then separated. This may be accomplished by applying sufficient heat to evaporate the water under the ambient conditions. Alternatively, we have also found it convenient to add an "emulsion breaker" which helps bring about a separation of the aqueous and interpolymer phases of the latex. In general, emulsion breakers usually react with emulsifying agents present and, in effect, neutralize said agents so that they can no longer function. Since the emulsifying agents used in the interpolymer latices of U.S. Patent 2,767,153 are anionic emulsifying agents, the emulsion breakers are preferably inorganic metallic salts and metallic acetate salts. Best results have been achieved using the salts of calcium, aluminum and zinc, e.g., calcium sulfate, aluminum sulfate and zinc sulfate. After the latex separates into its two phases, the water which distinctly separates from the mixture of latex and resinous solution is removed by decanting. The remainder of the water may be removed by vacuum distillation.

After the removal of the water, the pigment and the wax-like material are added to the dispersion of interpolymer in the resinous solution and the mixture is milled or mixed on a suitable device such as a 3 roll mill or a dough mixer to uniformly disperse the pigment and the wax-like material. While it is preferred to add the wax-like material at the same time that the pigment is added, the wax-like material may be added earlier, e.g., at the time that the latex and the resinous solution are mixed together.

The pigment is added in the standard proportions used in formulating printing inks, e.g., the pigment may constitute in the order of 10% to 70% of the total ink weight. Furthermore, any of the pigments used in conventional printing inks may be used in the ink of this invention.

In addition to the ingredients set forth above, the inks of this invention may contain any of the conventional additives used in inks. The ink may contain the conventional antioxidants including phenolic substances such as 2,6-ditertiary-butyl 4-methylphenol, hydroquinone and resorcinol and aromatic amines such as diphenylamine. The ink may also contain conventional surface-active agents such as alcohol fatty acids, ether, ether alcohols, esters, fatty alcohol sulfates and nitrogen compounds such as amides and amines.

While the present specification has been primarily concerned with inks, it should be understood that the novel vehicle of this invention may be used as a coating composition for polyolefins either in the pigmented or the unpigmented state.

It should also be understood that the ink of this invention may be used in printing on a wide variety of substrates other than polyolefins. Such other substrates include silk and other fabrics, paper, cellulosics such as cellulose acetate, acrylic polymers such as polymethylmethacrylate, rubber and vinyl copolymers such as polymers of vinylidene chloride.

The following examples will more fully set forth some specific embodiments of this invention.

*Example 1*

53.9 parts of an interpolymer latex having a 50% solids content of an interpolymer of 40% 2-ethylhexyl acrylate, 52% styrene, 6% acrylonitrile and 2% methacrylic acid prepared in accordance with U.S. Patent 2,767,153—Example 1—are slowly added to 25.9 parts of a 50% solution of cyclized rubber in a hydrocarbon solvent having a boiling range of 474–498° F. and a K.B. value of 27–28 over a period of 7 minutes on a 3 roll mill steam heated to a temperature of 220–250° F. The mixture is milled at this temperature until the water in the latex has substantially evaporated. (This may be determined by a water determination test indicating a water content of less than 1%.) The mill is then cooled and 9.5 parts of the above hydrocarbon solvent are added. After which 12.8 parts of phthalocyanine blue, 11.2 parts of Epolene N-10 (a polyethylene wax having a softening point of 111° C., ring and ball method, a density of 0.927 and a molecular weight of 2500) and, optionally, as an antioxidant, 4.8 parts of 2,6-di-tert-butyl 4-methylphenol (to improve shelf life) are added and the mixture is ground on the cold mill to produce a uniform dispersion of pigment and said interpolymer in the vehicle which is a solution of the cyclized rubber in said hydrocarbon solvent.

The ink produced is then tested by being used for printing on untreated polypropylene, low density polyethylene and high density polyethylene by the "dry-offset" printing method with a 15 minute drying at 190° F. (a method conventionally used for printing on polyolefins). The resulting printing displays excellent gloss, excellent rub resistance as well as excellent adhesion to polypropylene and low density polyethyene as demonstrated by the standard "Scotch Tape Test." The printed polypropylene and low density polyethylene also had excellent scratch resistance as demonstarted by scratching the printing using the front part of the nail. The "Scotch Tape Test" is carried out by pressing the adhesive face of Scotch tape against the printing and then jerking the tape away from the printed surface and determining whether any printed material is pulled away by the tape. While the high density polyethylene printing displays excellent gloss and rub resistance, the adhesion and scratch resistance are not as good as in the case of the low density polyethylene and the polypropylene.

*Example 2*

Example 1 is repeated using the same conditions, proportions and constituents except that 0.5 part of Armid HT, a fatty amide mixture comprising 22% hexadecanamide, 75% octadecanamide and 3% 9-octadecanamide is added at the same time that the pigment and polyethylene wax are added. The resulting printing ink displays the same desirable printing properties on polyethylene and polypropylene as does the ink of Example 1 and in addition displays adhesion and scratch resistance on high density polyethylene which is the equivalent of the excellent adhesion and scratch resistance of printing on low density polyethylene and polypropylene.

*Example 3*

Example 2 is repeated using the same constituents, proportions and conditions except that N,N' ethylene bis-stearamide is substituted for Armid HT. The resulting printing ink has the same properties as that of Example 2.

*Example 4*

Example 2 is repeated using the same constituents, proportions and conditions except that stearic acid is substituted for Armid HT. The resulting printing ink has the same properties as that of Example 2.

*Example 5*

58.7 parts of an interpolymer latex having a 48% solids content of an interpolymer of 40% 2-ethylhexyl acrylate, 52% styrene, 6% acrylonitrile and 2% methacrylic acid prepared in accordance with U.S. Patent 2,767,153—Example 1—are slowly added to 28.2 parts of a 50% solution of cyclized rubber in a hydrocarbon solvent having a boiling range of 516–543° F. and a K.B. value of about 27–29 in a dough mixer over a period of about 8 minutes. Since said interpolymer latex is conventionally supplied commercially containing an anionic emulsifying agent, it is preferable to include in the solution used herein an "emulsion breaker" which reacts with the anionic emulsifying agent to form an insoluble salt. Here we use 4.6 parts of a 50% aqueous solution of aluminum sulfate as emulsion breaker. The mixing on the dough mixer is continued until a homogeneous mixture is produced. A portion of the water will separate during the mixing and is removed. The remainder of the water is removed by vacuum stripping to a water content of less than 1%. The mixture is then permitted to cool to the ambient temperature and there is added 4.7 parts of cyclized rubber and 38 parts of the aforementioned solvent with mixing on the dough mixer. If long shelf life is desired 1 part of an anti-oxidant such as 2,6-di-tert-butyl 4-methylphenol may be added at this point.

Now, a premixture of 17.2 parts of cyclized rubber, 30 parts of Epolene N-10 (a polyethylene wax having a softening point of 111° C., a density of 0.927 and a molecular weight of 2500) and 52.2 parts of the above mentioned hydrocarbon solvent are milled on a 3 roll mill to disperse the wax.

An ink is then prepared by milling a mixture comprising 9 parts of said premixture, 59 parts of the mixture made on the dough mixer as described above, 25 parts of benzidine yellow pigment and 0.9 part of Armid HT on a 3 roll mill to produce a uniform dispersion of pigment and said interpolymer in the cyclized rubber-hydrocarbon solvent vehicle.

The resulting ink is then used in printing on both high and low density polyethylene and polypropylene. The printing on all of said substrates displays excellent adhesion, scratch resistance, gloss and rub resistance.

*Example 6*

Example 5 is repeated using the same constituents, proportions and conditions except that in place of Epolene N-10, there is used a polyethylene wax having a molecular weight of 10,000, a density of 0.947 and a softening point of 126° C. (ring and ball method). The ink produced has the same desirable properties for printing on polyolefins as does the ink of Example 5.

*Examples 7 and 8*

Example 5 is repeated using the same ingredients, proportions and conditions except that in place of Epolene N-10, there are used respectively a polyethylene having a molecular weight of about 40,000 and a softening point of 106° C. and a polyethylene having a molecular weight of about 1400. In both cases, the ink produced had the same desirable properties for printing on polyolefins as did the ink of Example 5.

*Examples 9–11*

Example 5 is repeated using the same ingredients, proportions and conditions except that in place of Epolene N-10, there are used:

Example 9: Carbowax 6000, polyethylene glycol having a molecular weight of 6000–7500.
Example 10: Carbowax 20,000, polyethylene glycol having a molecular weight of 15,000–20,000.
Example 11: The di-stearic acid ester of 6000 molecular weight polyethylene glycol.

In each of Examples 9–11, the ink produced has the same desirable properties for printing on polyolefins as does the ink of Example 5.

*Example 12*

Example 5 is repeated using the same constituents, proportions and conditions except that in place of the interpolymer latex of Example 5, there is used an interpolymer latex having a 50% solids content of an interpolymer of 40% decyl acrylate, 52% styrene, 6% acrylonitrile and 2% methacrylic acid prepared in accordance with U.S. Patent 2,767,153 (Example VII). The ink produced has the same desirable properties for printing on polyolefins as does the ink of Example 5.

*Example 13*

Example 5 is repeated using the same constituents, proportions and conditions except that in place of the interpolymer latex of Example 5, there is used an interpolymer latex having a 50% solids content of an interpolymer of 40% tridecyl acrylate, 52% styrene, 6% acrylonitrile and 2% methacrylic acid prepared in accordance with U.S. Patent 2,767,153 (Example VIII). The ink produced has the same desirable properties for printing on polyolefins as does the ink of Example 5.

*Example 14*

To a mixture of 328 parts of 50% solution of cyclized rubber in a predominantly paraffinic hydrocarbon solvent having a boiling range of 310–390° F. and a K.B. value of 38 and 54.6 parts of a 50% solution of aluminum sulfate in water in a dough mixer, there are added 680 parts of an interpolymer latex having a 48% solids content of an interpolymer of 40% 2-ethylhexyl acrylate, 52% styrene, 6% acrylonitrile and 2% methacrylic acid prepared in accordance with U.S. Patent 2,767,153 (Example 1). The mixture is continuously mixed at a temperature of about 140° F. A portion of the water in the mixture separates into a separate phase and is removed. The remaining water is removed by vacuum stripping. 317 parts of the paraffinic hydrocarbon solvent are added.

The following ink is then formulated with the above composition in a dough mixer.

| | Parts |
|---|---|
| Above composition | 46.5 |
| Chrome Orange pigment | 33.0 |
| Polyethylene glycol (M.W. 6000–7500) | 2.8 |
| Armid HT | 0.5 |
| Above paraffinic solvent | 17.2 |

This ink is used for printing on high and low density polyethylene and polypropylene by the silk screen process. The resulting printed structures display excellent "Scotch Tape" test adhesion and scratch resistance.

*Example 15*

To a mixture of 33.4 parts of 60% solution of 6% limed rosin in a hydrocarbon solvent having a boiling range of 548 to 584° F. and a K.B. value of about 28 and 5.72 parts of a 50% solution of aluminum sulfate in water in a dough mixer, there are added 73 parts of an interpolymer latex having a 48% solids content of an interpolymer of 40% 2-ethylhexyl acrylate, 52% styrene, 6% acrylonitrile and 2% methacrylic acid prepared in accordance with U.S. Patent 2,767,153 (Example 1). The mixture is continuously mixed at a temperature of about 140° F. A portion of the water in the mixture separates into a separate phase and is removed. The remaining water is removed by vacuum stripping. 23.2 parts of the hydrocarbon solvent are added.

The following ink is then formulated with the above composition in a dough mixer:

| | Parts |
|---|---|
| Above composition | 46.5 |
| Chrome Orange pigment | 33.0 |
| Polyethylene glycol (M.W. 6000–7500) | 2.8 |
| Armid HT | 0.5 |
| Above hydrocarbon solvent | 17.2 |

This ink is used for printing on high and low density polyethylene and polypropylene by the silk screen process. The resulting printed structures display excellent "Scotch Tape" test adhesion and scratch resistance.

While there have been described what is at present considered to be the preferred embodiments of this invention, it will be obvious to those skilled in the art that variout changes and modifications may be made therein without departing from the invention, and it is, therefore, aimed to cover all such changes and modifications as fall within the true spirit and scope of the invention.

What is claimed is:

1. A novel ink comprising pigment dispersed in a vehicle comprising (A) a dispersion of a particulate interpolymer of (1) about 35–60 parts by weight of an unsaturated ester taken from the group consisting of stragiht-chain and branched-chain saturated aliphatic alcohol esters of acrylic and methacrylic acid containing a total of about 5–20 carbon atoms in the alcohol radical of which about 5–14 carbon atoms comprise the longest continuous chain thereof, (2) about 3–10 parts by weight of an unsaturated nitrile taken from the group consisting of acrylonitrile and methacrylonitrile, (3) about 2–5 parts by weight of an unsaturated monocarboxylic acid taken from the group consisting of acrylic acid, methacryiic acid, cinnamic acid, atropic acid and crotonic acid and, correspondingly, (4) about 60–25 parts by weight of a monovinylidene aromatic hydrocarbon, the particles of said interpolymer having an average diameter of about 0.1 to 0.5 micron and (B) a dispersion of a wax-like material selected from the group consisting of polyethylene having a maximum molecular weight of about 40,000, polyethylene glycol having a maximum molecular weight of 20,000 and polyethylene glycol distearate in a solution of (C) a resin selected from the group consisting of limed rosin and cyclized rubber in (D) a volatile hydrocarbon solvent.

2. The ink of claim 1 wherein said interpolymer comprises (1) about 35–45 parts of 2-ethylhexyl acrylate, (2) about 3–10 parts of acrylonitrile, (3) about 2–5 parts of methacrylic acid, and, correspondingly, (4) about 60–40 parts of styrene, the interpolymer particles in said latex having an average diameter of about 0.1 to 0.5 micron.

3. The ink of claim 1 wherein said interpolymer comprises (1) about 35–45 parts of decyl acrylate, (2) about 3–10 parts of acrylonitrile, (3) about 2–5 parts of methacrylic acid, and, correspondingly, (4) about 60–40 parts of styrene, the interpolymer particles in said latex having an average diameter of about 0.1 to 0.5 micron.

4. The ink of claim 1 wherein said interpolymer comprises (1) about 35–45 parts of tridecyl acrylate, (2) about 3–10 parts of acrylonitrile, (3) about 2–5 parts of methacrylic acid, and, correspondingly, (4) about 60–40 parts of styrene, the interpolymer particles in said latex having an average diameter of about 0.1 to 0.5 micron.

5. The ink of claim 1 wherein said resin is cyclized rubber.

6. The ink of claim 1 wherein said resin is limed rosin.

7. The ink of claim 1 further containing a long-chain fatty amide.

8. The ink of claim 1 further containing stearic acid.

9. The ink of claim 1 wherein said wax-like material is polyethylene glycol having a maximum molecular weight of 20,000.

10. The ink of claim 1 wherein said wax-like material is polyethylene glycol distearate.

11. The ink of claim 1 wherein said wax-like material is polyethylene having a maximum molecular weight of about 40,000.

12. A novel ink comprising pigment dispersed in a vehicle comprising (A) a dispersion of a particulate interpolymer of (1) about 35–45 parts of 2-ethylhexyl acrylate, (2) about 3–10 parts of acrylonitrile, (3) about 2–5 parts of methacrylic acid, and, correspondingly, (4) about 40–60 parts of styrene, the interpolymer particles in said latex having an average diameter of about 0.1 to 0.5 micron, and (B) a dispersion of polyethylene having a molecular weight between 2500 and 10,000 in (C) a solution of cyclized rubber in a hydrocarbon solvent.

13. A novel coating composition comprising (A) a dispersion of a particulate interpolymer of (1) about 35–60 parts by weight of an unsaturated ester taken from the group consisting of straight-chain and branched-chain saturated aliphatic alcohol esters of acrylic and methacrylic acid containing a total of about 5–20 carbon atoms in the alcohol radical of which about 5–14 carbon atoms comprise the longest continuous chain thereof, (2) about 3–10 parts by weight of an unsaturated nitrile taken from the group consisting of acrylonitrile and methacrylonitrile, (3) about 2–5 parts by weight of an unsaturated monocarboxylic acid taken from the group consisting of acrylic acid, methacrylic acid, cinnamic acid, atropic acid and crotonic acid and, correspondingly, (4) about 60–25 parts by weight of a monovinylidene aromatic hydrocarbon, the particles of said interpolymer having an average diameter of about 0.1 to 0.5 micron and (B) a dispersion of a wax-like material selected from the group consisting of polyethylene having a maximum molecular weight of about 40,000, polyethylene glycol having a maximum molecular weight of 20,000 and polyethylene glycol distearate in a solution of (C) a resin selected from the group consisting of limed rosin and cyclized rubber in (D) a volatile hydrocarbon solvent.

14. A method of making a novel ink vehicle which comprises mixing (A) an aqueous latex of an interpolymer of (1) about 35–60 parts of an unsaturated ester taken from the group consisting of straight-chain and branched-chain saturated aliphatic alcohol esters of acrylic and methacrylic acid containing a total of about 5–20 carbon atoms in the alcohol radical of which about 5–14 carbon atoms comprise the longest continuous chain thereof, (2) about 3–10 parts by weight of an unsaturated nitrile taken from the group consisting of acrylonitrile and methacrylonitrile, (3) about 2–5 parts by weight of an unsaturated monocarboxylic acid taken from the group consisting of acrylic acid, methacrylic acid, cinnamic acid, atropic acid and crotonic acid and, correspondingly, (4) about 60–25 parts by weight of a monovinylidene aromatic hydrocarbon, the particles of said interpolymer having an average diameter of about 0.1 to 0.5 micron with (B) a solution of a resin selected from the group consisting of limed rosin and cyclized rubber in a volatile hydrocarbon solvent; separating water from the resulting mixture to produce a dispersion of said interpolymer in said solution and admixing with said solution a wax-like material selected from the group consisting of polyethylene having a maximum molecular weight of about 40,000, polyethylene glycol having a maximum molecular weight of 20,000 and polyethylene glycol distearate.

15. The method of claim 14 wherein an inorganic metallic salt is admixed with said mixture of latex and solution as an emulsion breaker.

16. The method of claim 15 wherein said metallic salt is aluminum sulfate.

17. The method of claim 14 wherein said interpolymer comprises (1) about 35–45 parts of 2-ethylhexyl acrylate, (2) about 3–10 parts of acrylonitrile, (3) about 2–5 parts of methacrylic acid, and, correspondingly, (4) about 60–40 parts of styrene, the interpolymer particles in said latex having an average diameter of about 0.1 to 0.5 micron.

18. The method of claim 14 wherein said interpolymer comprises (1) about 35–45 parts of decyl acrylate, (2) about 3–10 parts of acrylonitrile (3) about 2–5 parts of methacrylic acid, and, correspondingly, (4) about 60–40 parts of styrene, the interpolymer particles in said latex having an average diameter of about 0.1 to 0.5 micron.

19. The method of claim 14 wherein said interpolymer comprises (1) about 35–45 parts of tridecyl acrylate, (2) about 3–10 parts of acrylonitrile, (3) about 2–5 parts of methacrylic acid, and, correspondingly, (4) about 60–40 parts of styrene, the interpolymer particles in said latex having an average diameter of about 0.1 to 0.5 micron.

20. The method of claim 14 wherein said wax-like material is polyethylene having a maximum molecular weight of about 40,000.

21. The method of claim 14 wherein a long-chain fatty amide is admixed with said mixture of latex and solution.

22. The method of claim 14 wherein stearic acid is admixed with said mixture of latex and solution.

23. The method of claim 14 wherein said resin is cyclized rubber.

24. A method of printing on polyolefins which comprises applying to said polyolefins an ink comprising pigment dispersed in a vehicle comprising (A) a dispersion of a particulate interpolymer of (1) about 35–60 parts by weight of an unsaturated ester taken from the group consisting of straight-chain and branched-chain saturated aliphatic alcohol esters of acrylic and methacrylic acid containing a total of about 50–20 carbon atoms in the alcohol radical of which about 5–14 carbon atoms comprise the longest continuous chain thereof, (2) about 3–10 parts by weight of an unsaturated nitrile taken from the group consisting of acrylonitrile and methacrylonitrile, (3) about 2–5 parts by weight of an unsaturated monocarboxylic acid taken from the group consisting of acrylic acid, methacrylic acid, cinnamic acid, atropic acid and crotonic acid and, correspondingly, (4) about 60–25 parts by weight of a monovinylidene aromatic hydrocarbon, the particles of said interpolymer having an average diameter of about 0.1 to 0.5 micron and (B) a dispersion of a wax-like material selected from the group consisting of polyethylene having a maximum molecular weight of about 40,000 polyethylene glycol having a maximum molecular weight of 20,000 and polyethylene glycol distearate in a solution of (C) a resin selected from the group consisting of limed rosin and cyclized rubber in (D) a volatile hydrocarbon solvent.

25. A method of printing on polyolefin which comprises applying to said polyolefins an ink comprising pigment dispersed in a vehicle comprising (A) a dispersion of a particulate interpolymer of (1) about 35–45 parts of 2-ethylhexyl acrylate, (2) about 3–10 parts of acrylonitrile, (3) about 2–5 parts of methacrylic acid, and, correspondingly, (4) about 40–60 parts of styrene, the interpolymer particles in said latex having an average diameter of about 0.1 to 0.5 micron, and (B) a dispersion of polyethylene having a molecular weight between 2500 and 10,000 in (C) a solution of cyclized rubber in a hydrocarbon solvent.

No references cited.